United States Patent

Tetro

[11] 4,170,457
[45] Oct. 9, 1979

[54] AIR SEPARATOR METHOD AND APPARATUS

[75] Inventor: Richard S. Tetro, Fulton, N.Y.

[73] Assignee: The Black Clawson Company, Middletown, Ohio

[21] Appl. No.: 902,938

[22] Filed: May 4, 1978

Related U.S. Application Data

[63] Continuation of Ser. No. 734,287, Oct. 20, 1976, abandoned.

[51] Int. Cl.² .................. B01D 19/02; D21H 1/48
[52] U.S. Cl. ............................ 55/46; 55/87;
55/178; 55/182; 55/204; 55/207; 55/400;
233/DIG. 1; 427/345; 162/136
[58] Field of Search .................... 55/39, 46, 87, 178,
55/182, 184, 203, 204, 207, 385 R, 400, 406,
407; 118/603; 427/356, 401, 345; 233/21, 22,
DIG. 1; 162/135, 136

[56] References Cited

U.S. PATENT DOCUMENTS

| | | | |
|---|---|---|---|
| 1,081,267 | 12/1913 | Christensen | 233/21 |
| 1,263,439 | 4/1918 | Leitch | 233/21 |
| 2,275,355 | 3/1942 | Finken | 55/204 |
| 2,785,765 | 3/1957 | Cornell | 233/21 |
| 3,274,307 | 9/1966 | Bergstein et al. | 118/603 |
| 3,292,577 | 12/1966 | Cressey, Jr. et al. | 118/603 |
| 3,960,319 | 6/1976 | Brown et al. | 233/21 |

FOREIGN PATENT DOCUMENTS 924143 7/1947 France ........................ 415/89

Primary Examiner—Frank W. Lutter
Assistant Examiner—David L. Lacey
Attorney, Agent, or Firm—Biebel, French & Nauman

[57] ABSTRACT

A rotating separator removes air coating from pigmented paper coating liquid stock. The separator employs a cylindrical tank which is mounted for rotation about a vertical axis. The separator is operated in a filled condition and an air laden or froth fraction is removed from a radially central region of the tank at the top of the tank, while a non-rotating pickup receives air free coating from a region adjacent the wall of the tank near the tank bottom. A method of treating and applying such a coating includes the steps of pumping an air laden coating into a centrifugal separator while maintaining the separator in a filled condition, removing an air froth from the separator for return to the supply tank, and delivering a substantially air free coating directly to the inlet of a control without the imposition of any intermediate pumping apparatus. The centrifugal pumping action of the separator supplements the pressure head on the coating material.

3 Claims, 7 Drawing Figures

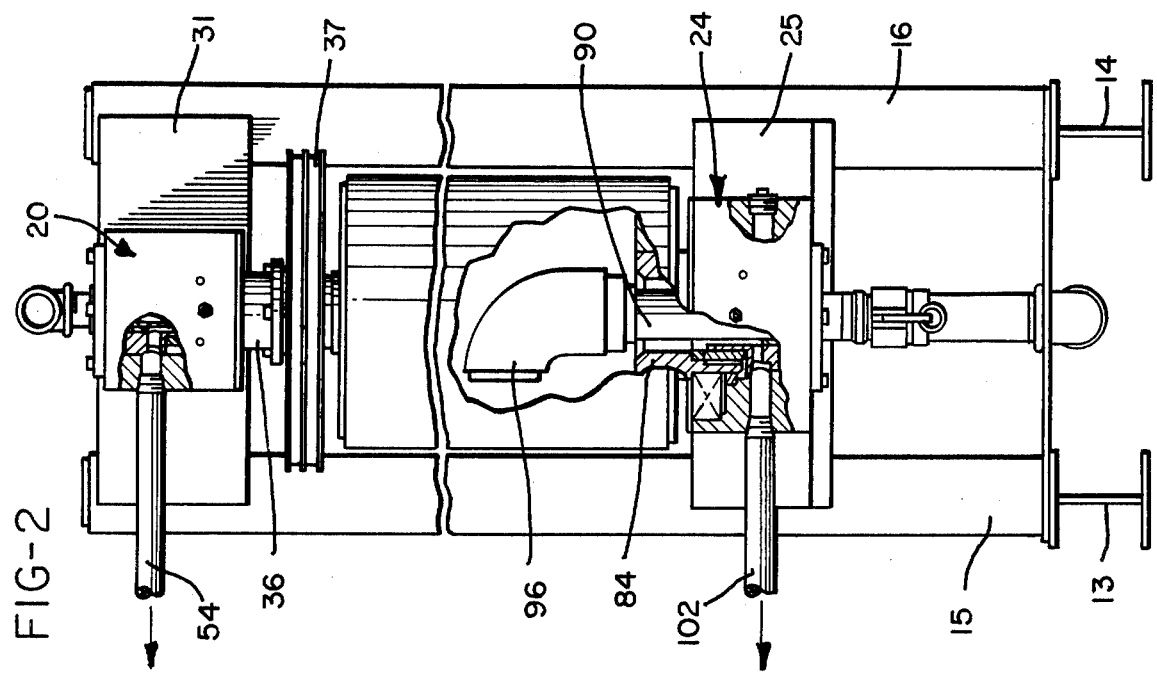
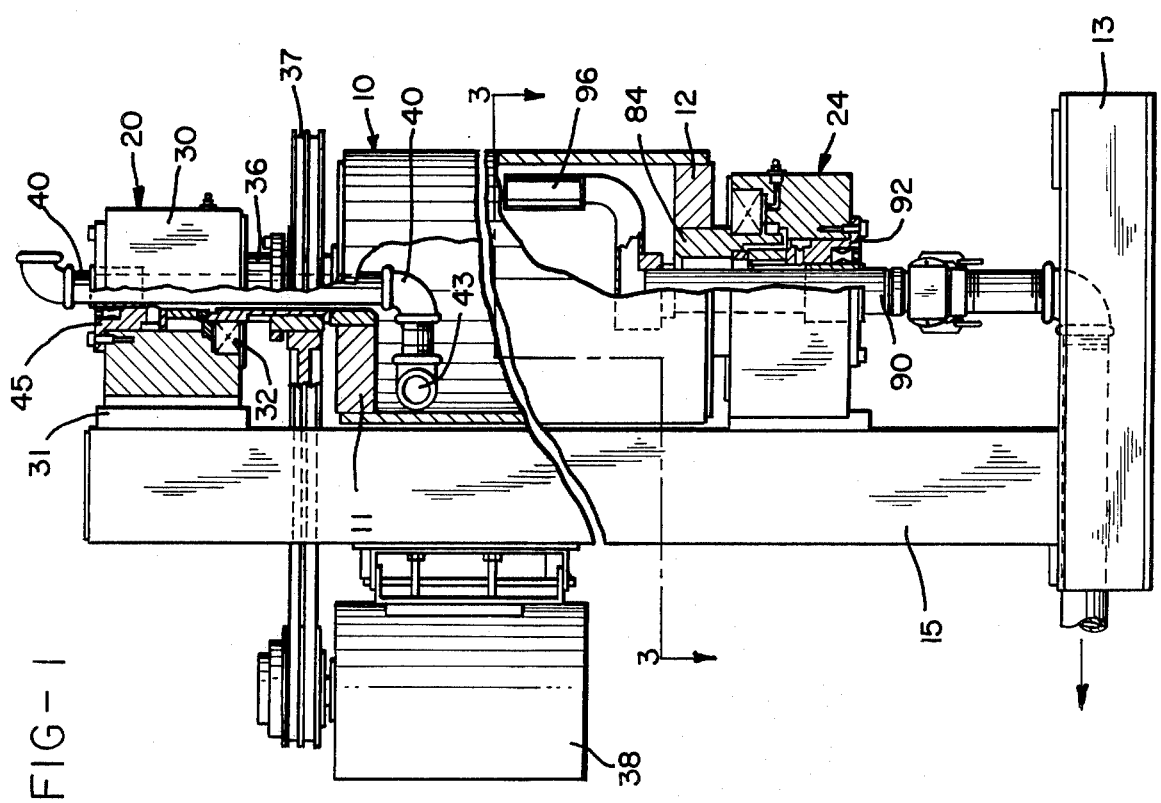

4,170,457

AIR SEPARATOR METHOD AND APPARATUS

RELATED APPLICATION

This application is a continuation of U.S. Ser. No. 734,287 filed Oct. 20, 1976 now abandoned.

BACKGROUND OF THE INVENTION

This invention is directed to the art of separation of entrained air and froth from pigmented coatings and the like, in a paper coater or converter. The invention particularly is directed to apparatus and method for applying clay type coatings or the like to a moving web of paper, and to apparatus and method by means of which entrained air bubbles are separated, so that a substantially air-free coating stock is applied to the web coating apparatus, and the air and air laden coating fraction is removed for recirculation to the coating supply tank.

Paper coating materials, such as pigmented coatings, are commonly applied by coater apparatus in which an excess supply of the coating is removed by a doctor blade, air knife, or the like, and recirculated to a coating supply tank. During the mixing, pumping, applying and/or doctoring steps, the coating is likely to pick up entrained air in the form of large discrete bubbles and froth which is returned to the coating tank. Due to the relatively high viscosity of the coating material commonly used for paper coating, the bubbles and entrained air particles have a tendency to remain within the coating for a long period of time. They are not readily separated merely by settling due to the slow movement of the bubbles through the liquid.

When coating materials including entrained air are redelivered to the coating head, which may be a fountain type coater, the larger bubbles may cause the coating to skip or otherwise be applied unevenly.

Various attempts have been made to break up the larger bubbles into air bubbles which are sufficiently small as to cause no problem. Thus, screens have been used to break up the larger bubbles into smaller bubbles. However, it has been found that a screen tends to compress the air on one side, and the air has a tendency to expand on the other side of the screen and recombine again into larger bubbles. It has been observed that screens break up only the very large bubbles.

Vortex type separators have been used as shown, for example, in U.S. Pat. Nos. 2,894,930 of 1958, 2,920,761 of 1960 and 3,007,542 of 1961. Such vortex separating equipment commonly requires the use of vacuum for reducing the center pressure and thereby assist in the removal of the air bubbles. While vortex separation has been successful in the separation or deaeration of paper pulp suspensions, it has not proven to be particularly successful in the separation of entrained air from highly viscous coatings. Also, the fact that the vortex separator is commonly operated at low pressure requires the imposition of a pump between the separator and the coating head. However, any time viscous clay coating is agitated, as in pumping, there is an increased danger of picking up or introducing additional air.

Other apparatus for removing or eliminating air has included elastic ultrasonic wave generators, as shown in U.S. Pat. Nos. 3,169,507, 3,169,508 and 3,169,509 of 1965.

SUMMARY OF THE INVENTION

As noted, the invention is directed to the art of coating and particularly for removing air laden or air rich coating fractions from paper coating material. In the method of this invention, a quantity of coating material having entrained air bubbles is delivered to the inlet of a pump, and from the pump it is delivered to a rotating centrifugal separator under a positive head of pressure. The separator is maintained in a full condition. Preferably, the separator consists of a rotating, generally vertically oriented cylinder which has a tangential inlet for directing the flow of air laden coatings along one inside cylindrical wall in the direction in which the cylinder is rotating. A first outlet is formed at or near the top of the separator and continuously removes from a region near the axis of the separator an air rich foam or froth of the stock material which has been brought to the center region of the separator by centripetal force. A non-rotating outlet is near the bottom of the rotating tank and is arranged to pick up air free coating from a region adjacent the rotating wall and for direct delivery to the coater. The coating is thus delivered in an air-free state without the imposition of an intermediate pumping apparatus. In other words, coating is continuously removed from a radial outer region of the rotating separator by a non-rotating pickup which defines a second outlet for the tank. This pickup is preferably spaced from the lower end of the tank for extraction of air free coating and is preferably positioned to intercept the rotating coating liquid which is turning substantially at the same velocity as the tank itself. In this manner, an additional head of pressure is applied to the coating liquid in that the energy of the rotating mass is translated into a static pressure head at the pickup. This head is in addition to the pressure head exerted upon the material within the tank by the pumping means positioned upstream of the tank. Only so much of the air laden or air rich coating is removed from the central region by the first outlet as is necessary to assure an air free coating at the second outlet. Thus, the rotating tank is operated at all times in a filled or substantially filled condition.

It is accordingly an important object of this invention to provide a method of applying clay coatings and the like to a moving web of paper including particularly the applying of a liquid coating containing entrained air bubbles to a rotating separator under a positive head of pressure and continuously removing air laden coating from a central region of the separator, continuously removing the substantially air free coating from a radially outer region of the separator, and conveying the air free coating directly to a coater without the imposition of additional or intermediate pumping apparatus.

Another object of the invention is the provision of a rotating tank separator, as outlined above, which is adapted to be operated in a filled or substantially filled condition and from which air laden coating is removed for recirculation to a supply tank and air free coating is removed from an outer region of the tank for delivery to a coater.

These and other objects and advantages of the invention will be apparent from the following description, the accompanying drawings and the appended claims.

BRIEF DESCRIPTION OF THE DRAWINGS

FIG. 1 is an elevational side view, partially broken away, of a rotating separator constructed according to this invention;

FIG. 2 is an elevational front view thereof, also partially broken away;

DESCRIPTION OF THE PREFERRED EMBODIMENT

Figure 3:
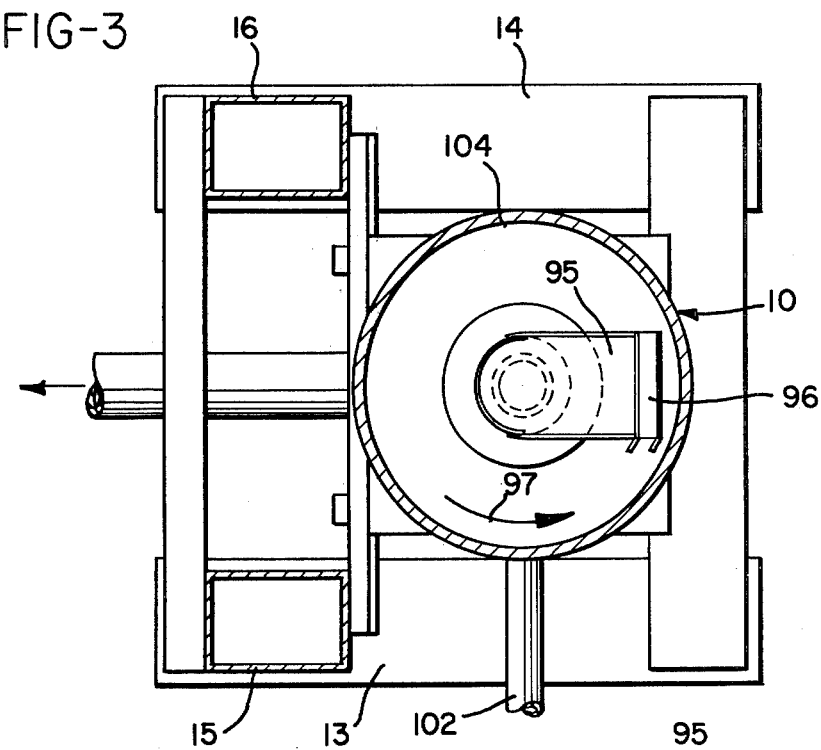
FIG. 3 is a transverse section through the separator taken generally along the line 3—3 of FIG. 1.

A rotary separator constructed according to this invention is illustrated in FIGS. 1 and 2 as including a generally vertically oriented, cylindrical tank 10. The tank 10 has a cylindrical wall 10a, a top closure wall 11 and a bottom closure wall 12. The tank 10 is mounted for rotation on a support structure which includes a pair of spaced I-beams 13 and 14, forming a base. A pair of box beams 15 and 16 (FIG. 2) extend upwardly on the beams 13 and 14.

Figure 4:
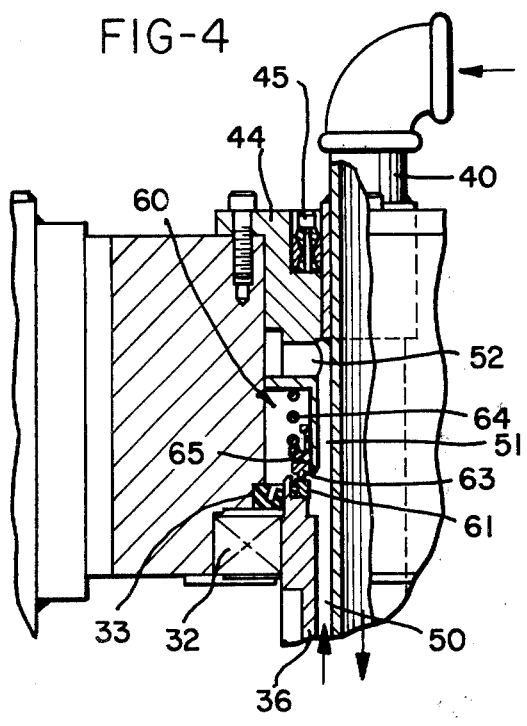
FIG. 4 is an enlarged vertical fragmentary view of the detail of the inlet at the top of the separator.
Figure 5:
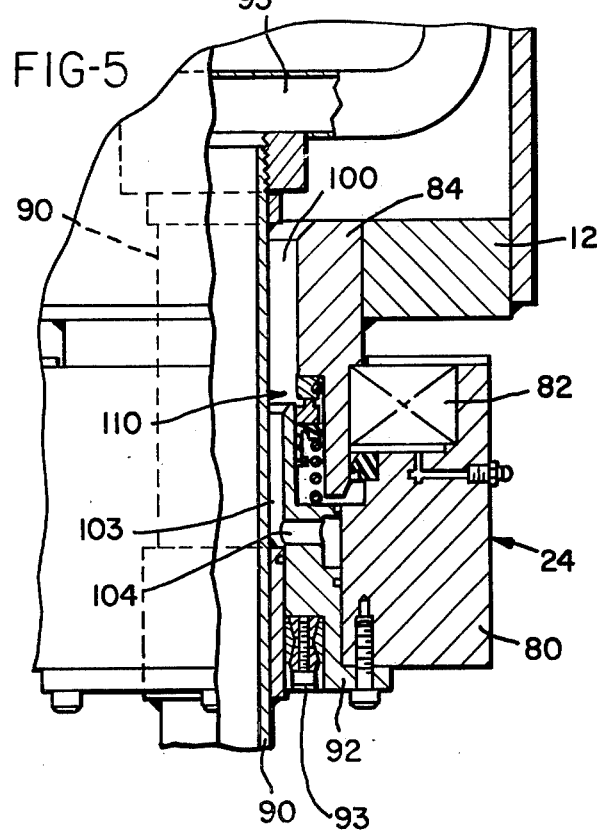
FIG. 5 is an enlarged fragmentary view showing details of the outlet at the bottom of the separator.

Rotating support for the tank 10 includes an upper joint and bearing assembly 20 shown in enlarged cross-sectional detail in FIG. 4 and a lower joint and bearing assembly 24 shown in enlarged detail in FIG. 5. The assembly 20 includes an enlarged collar 30 mounted directly on a cross member 31, extending between the upright beams 15 and 16. The collar 30 internally supports a bearing 32 and a grease seal 33 by means of which the upper end of the tank 10 is supported for rotation. For this purpose, the upper closure wall 11 of the tank 10 supports an upwardly extending hollow shaft 36. The lower end of the shaft 36 extends through an opening formed in the wall 11 and is welded thereto, while the upper end of the shaft 36 is supported for rotation within the bearing 32. As shown in FIG. 1, the shaft 36 intermediate its ends supports a pulley 37 for belt drive by a motor 38 mounted on the upright beams 15 and 16.

The hollow shaft 36 provides the means by which the coating liquid is admitted into the interior of the cylindrical tank 10, and also provides the means by which a foam laden or foam rich lightweight coating fraction is removed from the tank 10. Inlet means for admitting coating into the tank 10 for separation of air therefrom includes a depending nonrotating inlet pipe 40 which extends downwardly through the collar 30 and through the hollow shaft 36. The pipe 40 terminates at its lower end in offset relation to the central axis of the cylinder 10, and defines a tangential outlet orifice 43. The orifice 43 is positioned in such a manner that the direction of fluid flow into the tank 10 is in the same direction that the adjacent tank wall 10a is rotated by the motor 42.

The upper end of the inlet pipe 40 is supported on the collar 30 by a sleeve 44 and is secured to the sleeve by an expanding annular pipe clamp 45. The pipe clamp 45 may be of the type sold under the trademark "Ringfeder" by Ringfeder GmbH, Krefeld-Uerdingen, Germany, and sold in the United States by Adam Kreuter Associates, Pittsford, N.Y. 14534. The outside diameter of the inlet pipe 40 is less than the inside diameter of the shaft 36 to define an annular tank outlet 50 therebetween. The annular outlet 50 communicates with an axial passage 51 and radial passage 52 formed in the sleeve 44. This, in turn, opens into a threaded outlet pipe 54 in the sleeve 30. The annular passage 50, passages 51 and 52, and the pipe 54, define a first outlet which opens into the tank 10 substantially at a radially central region thereof in surrounding relation to the inlet pipe, and provides means for the extraction from the tank of a separated air-rich coating and entrained air bubbles from the top of the tank at a radially central region thereof.

An end face rotating seal assembly 60 is mounted on a flange portion 61 of the sleeve 44 and cooperates with a fixed ring 61 carried on the shaft 36. The rotating seal assembly 60 further includes a spring-biased annular washer 63 bearing on the ring 61, a compression spring 64 and a sealing diaphragm 65. The seal assembly 60 may be a "type 21" seal manufactured by Crane Packing Company, Morton Grove, Ill. The assembly 60 forms a fluid tight rotating coupling between the shaft 36 and the sleeve 44.

The lower end of the tank 10 is supported for rotation in the assembly 24 similar to the manner which has been described in the connection with the assembly 20 at the upper end. For this purpose, a collar 80 is provided with a bearing 82, the latter being rotatably mounted on a hollow lower extension shaft 84. The shaft 84 is received within a central opening formed in the lower tank wall 12, as shown in FIG. 5, and is welded to the wall 12. A non-rotating coating outlet pipe 90 extends into the interior of tank 10 at the lower end thereof and extends downwardly through the collar 80. The pipe 90 is retained on the collar 80 by a sleeve 92 and is secured by an expanding pipe clamp 93 identical to the clamp 45 above.

The upper end of pipe 90 supports a coating pickup tube 95. As shown in FIG. 1, the tube 95 extends radially outwardly and axially upwardly, and terminates in an inlet 96 (FIG. 1). The inlet 96 is positioned somewhat above the bottom 12 of the tank 10, and is positioned adjacent the inside surface of the tank wall 10a. The inlet 96 opens toward the direction of rotation of liquid coating within the tank 10 as shown by the arrow 97 in FIG. 3. In this manner the energy of the rotating coating liquid is transferred into pressure as it impacts against the inlet 96 and flows therein and downwardly through the pickup tube 95 and the connected pipe 90 for extraction from the tank 10. The spacing of the inlet 96 somewhat axially above the bottom wall 12 assures that the opening therein is in a region of rotating liquid and above any possible stagnated layer due to impedance to rotation of the liquid caused by the non-rotating tube 95.

The outside diameter of the outlet pipe 90 is less than the inside diameter of the shaft 84 to provide an annular drain outlet 100 (FIG. 5). The drain outlet 100 may be connected to a radially extending drain pipe 102 through an annular passage 103 and a radial passage 104 in the sleeve 92 by means of which a tank 10 may be completely drained for purging or cleaning. A rotating end face seal assembly 110, similar to the assembly 60, is received on the sleeve 92 and forms a rotating seal with the shaft 84.

Figure 6:
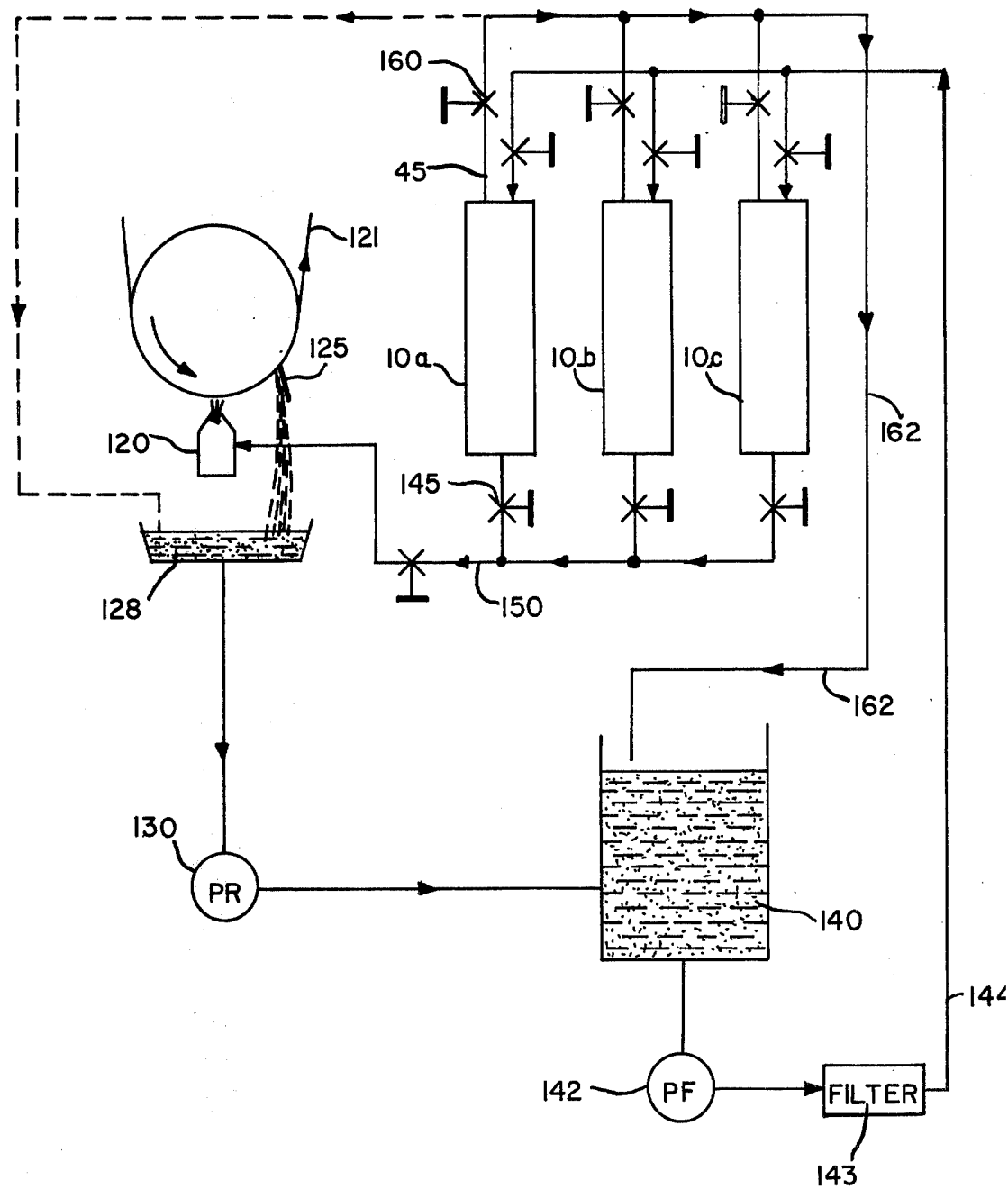
FIG. 6 is a flow diagram illustrating the overall apparatus employed in this invention.

In FIG. 6, a coating system is shown according to the method of this invention by means of which air free coating may be applied to a moving web of material.

In the practice of the method of this invention, FIG. 6 illustrates the use of three identical separator tanks 10 connected in parallel for the delivery of air free coating to a coater, which is diagrammatically illustrated at 120, from one or more of the tanks. The coater 120 is illustrated in FIG. 6 as being of the fountain type (as described in U.S. Pat. Nos. 3,418,970 and 3,521,602) to apply the liquid coating to a web 121. The excess coating is removed by a doctor blade 125 and returned to a catch pan or basin 128. The apparatus and method of the present invention may be used with any type of coater, including trough type applicators, fountains, or roll type applicators with doctor blade, air knife or metering bar apparatus. Typically, a substantial excess coating is applied by the apparatus, and up to ninety percent or more of the applied coating may be removed by a doctor blade. It is common to apply an excess of coating material so that there is a sufficient excess of coating doctored off to wash the doctor blade and prevent the occurrence of dry areas, or the build up of dried coating, on the doctor blade. Thus the coating which is caught and returned is subjected to substantial mechanical agitation and is often subjected to a certain amount of atomization or breaking up of the coating particles, so that a substantial quantity of air may be mixed in with the coating material.

The coating itself may vary widely in characteristics. Typically, the coating includes clay pigments and a starch base and may have a low viscosity of 400 CPS or less (as measured by Hercules and Brookfield) at 110° F. up to 3,500 CPS or more (Hercules and Brookfield). Such coatings may contain as little as twenty percent solids, or less, or as great as seventy percent solids or more.

Typically, a variable flow rate pump 130 returns the air laden coating to a main supply tank 140. In the process of the invention, a variable flow rate supply pump 142 delivers coating through a filter 143 and a common supply line 144 to the inlet 40 of one or more of the tanks 10a, 10b and 10c as illustrated in FIG. 6. The tank or tanks being used will be subject to continuous rotation by their motors 38 for separation of the lighter and air laden fraction and for delivery of a substantially air free coating fraction through the outlet pipe 90. The coating outlet pipe 90 of each respective tank is connected through valves 145 to a common coating supply line 150, which supplies the air free coating directly to the coating head 120. Individual valves 160 are preferably inserted within the outlet pipes 54 to a common return line 162. The valves 160 control the static pressure of the coating liquid within the tanks 10 by controlling the rate at which the lighter air laden coating is removed from the respective tanks. The use of two or more separators as shown at 10a, 10b and 10c of FIG. 6 permits a selection in the capacity of air-free coating required and also permits one of the units to be shut down for cleaning while the others are in operation.

In the operation of the invention, coating which contains entrained air is supplied to the interior of the cylindrical tank 10 through the inlet pipe 40 and outwardly through the tangential outlet 46. The tank is at all times filled or substantially filled with coating. The tank is rotated in the direction of fluid flow from the outlet by the motor 38, and the entire mass of liquid rotates with the tank. The material is thus delivered to the interior of the tank under a positive head of pressure from the variable supply pump 142. The air bubbles being substantially lighter than the coating, tend to concentrate at the top of the tank near the closure wall 11 and also at the radially central region of the tank, and are removed together with a quantity of the coating through the annular outlet 50 and the outlet passages 51 and 52 to the pipe 54. This foam laden material is thus returned to the supply tank 140 preferably through the valve 160 as described above.

The relatively air free coating is picked up by the inlet 96 and pickup tube 95 positioned adjacent the inside wall of the tank 10 in spaced relation to the bottom wall 12, and is delivered directly to the coating head 120 under the cumulative head of the pump 142 and an additional head induced by the rotation of the coating liquid within the separator. The drain passages 100, 102 and 104 may be employed when it is desired to completely drain out and clean the tank 10.

In the operation of the invention, and as an example, a tank 10 was constructed which was 42" long and 9" inside diameter with a capacity of approximately fifteen gallons. The motor rotated the tank about its vertical axis at from 500 to 600 revolutions per minute. Coating material of 1,700 CPS (110° F. Hercules and Brookfield) having 56 percent solids was supplied to the tank at a rate of approximately twelve gallons per minute and coating free of air was extracted at a rate of approximately eleven gallons per minute while approximately one gallon per minute of foam laden overflow was permitted to flow out of the tank through the outlet passages 50, 51 and 52 into the pipe 54 back into the supply. The output of the pipe 102 was free of any visible entrained air, and was directly supplied to a fountain coater which, in turn, applied the coating to a moving web of material at about 0.8 gal/inch/min. at 2,000 fpm, free of any skips and separations in the continuity of the coating. In another test, 420 CPS, 42% solid coating was supplied to the tank in excess of twenty gallons per minute and air free coating was supplied at about 19.5 gallons per minute to the coater which applied the coating to a 2,000 fpm web at the rate of 0.7 gal./inch/min. free of skips.

The rate of rotation of the tank 10 may be varied within wide limits as necessary to effect a separation of the entrained air and foam toward the center of the tank by centripetal force but not at such a rate as to cause a separation of the constituent components of the coating itself.

It will thus be seen that the invention provides method and apparatus for the skip-free coating of paper webs and the like by the separation in a rotating tank of the air-rich fraction of the coating without attempting to break the air bubbles down into smaller bubbles. Since the tank is maintained in a full or substantially full condition, it is operated under a positive head of pressure, and this pressure is augmented by the pumping effect of the rotating liquid coating impinging upon inlet 96 of the static pickup tube 95 sufficient to permit application of the coating directly from the tank to a coating head. The rate at which foam is extracted through the pipe 54 may be used advantageously to control the pressure head within the tank, while the return coating foam mixture is delivered to the holding tank for reuse.

While the method herein described, and the form of apparatus for carrying this method into effect constitute preferred embodiments of this invention, it is to be understood that the invention is not limited to this precise method and form of of apparatus, and that changes may be made in either without departing from the scope of the invention.

What is claimed is:

1. A method of removing entrained air from liquid paper coating material for subsequent application of such material to a moving web of paper by means of a coater having an inlet for liquid coating material, comprising the steps of providing a quantity of liquid coating material containing a quantity of entrained air bubbles therein, supplying said liquid coating material under a positive head of pressure to the interior of a tank-type rotating centrifugal separator and maintaining the separator in a substantially full condition, continuously removing said air laden coating material from a radially central region of said separator, continuously removing substantially air free coating material from a radially outer region of said separator, and conveying said air free coating material directly to said coater inlet without the imposition of intermediate pumping apparatus for application by said coater to a moving web of paper.

2. A method of removing entrained air from liquid paper coating material for subsequent application of such material to a moving web of paper by means of a coater having an inlet for liquid coating material, comprising the steps of providing a supply of liquid coating material containing a quantity of entrained air bubbles therein, deliverying said coating material from said supply to the inlet of a pump, deliverying the coating material from the outlet of said pump to a rotating tank-type centrifugal separator under a positive head of pressure from said pump and maintaining the separator in a substantially full condition, continuously removing said air laden coating from a radially central region of said separator, continuously removing substantially air free coating from a radially outer region of said separator, and conveying said air free coating directly to the inlet of the coater under the cumulative head of said pump and the head induced by said separator without the imposition of intermediate pumping apparatus for application by said coater to a moving web of paper.

3. A separator for removing air bubbles and other entrained gas and air particles from a source of paper coating liquids under pressure, comprising:
- a generally vertically oriented cylindrical tank having a closed top, a closed bottom, and a cylindrical side wall, and adapted to be operated in a substantially filled condition,
- means mounting said tank for rotation about a generally vertical axis,
- means in said tank top defining a coating liquid inlet positioned to deliver air laden coating liquid generally tangentially of the side wall of said tank adjacent the upper end thereof and in the direction of tank rotation,
- coating supply conduit means connecting said source of coating liquid to said inlet for admitting coating into said tank under pressure from said source,
- means in said tank defining a first outlet which extends through said tank top and which opens into said tank substantially at a central region thereof adjacent said top for extraction therefrom of separated air laden coating for return thereof to said supply,
- means in said tank defining a second outlet having a liquid inlet orifice spaced axially from said tank bottom adjacent the side wall of said tank in non-rotating relation to said wall to intercept air free coating liquid for delivery thereof to a coater, and
- means for rotating said tank about said axis in the direction of flow of liquid from said coating liquid inlet to impart a corresponding rotation to the body of liquid within said tank.

* * * * *